Aug. 28, 1962 R. C. DREIER 3,051,493

PHONOGRAPH PICK-UP DEVICE

Filed March 26, 1959 2 Sheets-Sheet 1

INVENTOR.

RAYMOND C. DREIER

BY

Prangley, Baird, Clayton, Miller & Vogel

Att'ys.

PHONOGRAPH PICK-UP DEVICE

Filed March 26, 1959

INVENTOR.

RAYMOND C. DREIER

BY

Prangley, Baird, Clayton, Miller & Vogel

ATT'YS.

United States Patent Office 3,051,493

Patented Aug. 28, 1962

3,051,493
PHONOGRAPH PICK-UP DEVICE

Raymond C. Dreier, 6930 South Shore Drive, Chicago, Ill.

Filed Mar. 26, 1959, Ser. No. 802,064
7 Claims. (Cl. 274—23)

This invention relates to a tone arm assembly for a phonograph, disc recorder or the like, and it is the object of the invention to provide improved apparatus of that character.

In the recording of phonograph records the stylus of the recording apparatus is made to move radially inward of the phonograph disc at constant speed such that a uniform spiral groove is obtained. The recording stylus is at the same time maintained tangent to the spiral groove such that undulations of the groove representing the recorded sound have a maximum component laterally of the groove. One form of apparatus accomplishing radial movement and fixed orientation of the stylus and recording head includes one or more ways along which the recording head is moved.

In play back of records it is desirable that the stylus again move radially inward and that it remain at all times tangent to the groove. The reasons for this are well known in the art and need not be reviewed herein. Conventional tone arms for phonographs are pivoted to a fixed base and swing the associated stylus in an arc. The stylus therefore cannot move in a straight line and cannot remain tangent to the groove, all as is well understood in the art. The deviation in the horizontal projection of the stylus from tangency to the groove being played is known in the art as the tracking error. Some prior art tone arms are designed to minimize tracking error by employing a parallelogram linkage, but a tracking error of significant magnitude remains because of the inherent inability of these prior art devices to move the stylus in a straight line as well as to maintain fixed orientation of the stylus.

It should also be noted that apparatus employing one or more ways, as is sometimes used in recording, is unsatisfactory for play-back because of the unavoidable friction in such apparatus which causes the stylus to bear heavily against the outer side of the groove as the spiral groove urges the needle inward. In the recording of discs the recording head is moved forcibly inward as by a feed screw, whereby the inherent friction in the sliding movement of the recording head along the ways is of little significance.

In accordance with the present invention the stylus and the reproducing or recording head are mounted on the phonograph or recorder base through a linkage which maintains the stylus and head in fixed orientation while permitting movement through or along a straight line.

Accordingly, it is another object of the invention to provide an improved tone arm assembly for a phonograph, disc recorder or the like, in which a stylus and head are permitted to move with a minimum of friction only along a straight line while being maintained in fixed orientation.

It is still another object of the invention to provide an improved tone arm assembly of the character specified above which is efficient, reliable and inexpensive to manufacture.

This invention, together with further objects and advantages thereof, will be best understood by reference to the following description taken in connection with the accompanying drawings and its scope will be pointed out in the appended claims.

In the drawings in which like parts are designated by like reference numerals:

Figures 1, 2, 3, 10:
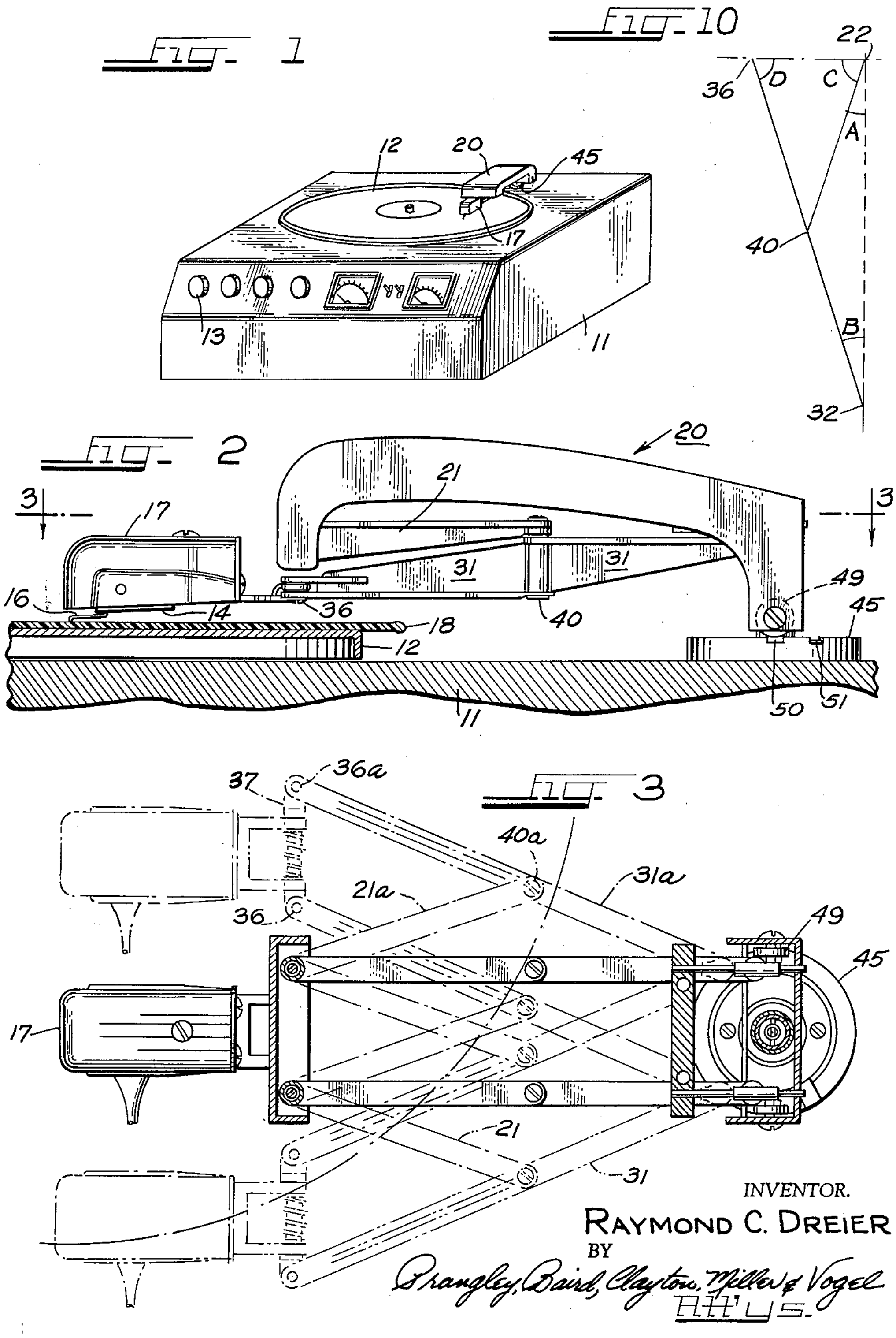
FIG. 1 is a perspective view of a complete phonograph turntable including a tone arm assembly embodying the invention.
FIG. 2 is a side elevation of the tone arm assembly of FIG. 1.
FIG. 3 is a cross-sectional view taken along the line 3—3 of FIG. 2 and showing certain linkage incorporated therein in different operating positions.
FIG. 10 is a diagram for facilitating geometric proof of the operation of the linkages best seen in FIG. 3.

A tone arm assembly constructed in accordance with the present invention is illustrated in the drawings applied to a phonograph. The latter includes a base or stand 11, a turntable 12 and suitable controls 13. A cartridge 14, a portion of which may be seen in FIG. 2 and its stylus 16 are carried in a stylus carrying means or cartridge head 17, the stylus 16 being adapted to follow grooves in a phonograph record 18 carried by the turntable 12. As is well known in the art, it is desirable that the stylus 16 remain at all times tangent to the record groove which it is tracking. Deviation from tangency, referred to in the art as tracking error, results in distortion in the output of the cartridge.

The outstanding characteristic of the tone arm assembly of the present invention is that it permits tracking of the record groove by the stylus 16 while maintaining the cartridge and stylus at all times tangent to that part of the groove in contact with the stylus.

In the illustrated embodiment of the invention support means including an overhanging base or frame 20 is provided which is normally stationary with respect to the turntable stand 11. As best seen in FIG. 3 a pair of linkages are employed to mount the cartridge head 17 or stylus carrying means on the base 20. Since the two linkages may be, and preferably are, identical, only one is described in detail herein. Reference numerals applied to one linkage are also applied to the other linkage followed by the letter "*a*."

As will be recognized by those skilled in the art, each of the two linkages which support and control the cartridge head on the base 20 is of a general form known as a Scott Russell straight line mechanism. The disclosed linkage, however, incorporates an improved form of Scott Russell mechanism, and employs a pair of such mechanisms to produce results not obtainable with a single mechanism of the Scott Russell type.

Figure 4:
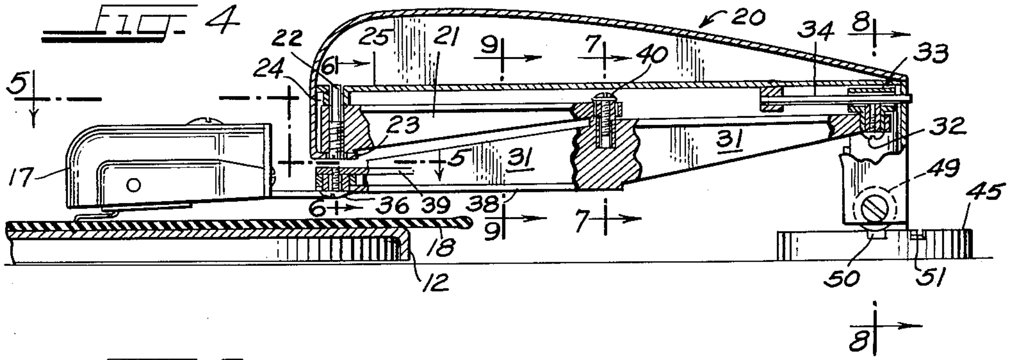
FIG. 4 is a view similar to FIG. 2 but showing various portions of the tone arm assembly broken away or in cross section.
Figures 5, 6:
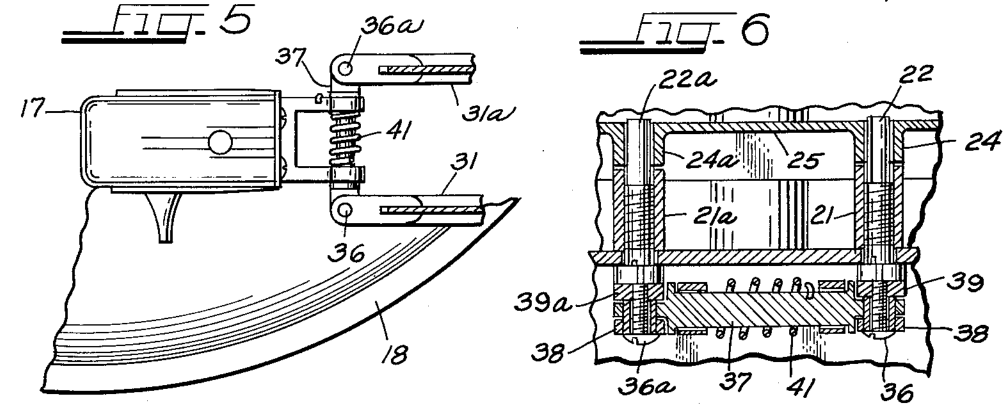
FIG. 5 is a partial cross-sectional view taken along the line 5—5 of FIG. 4.
FIG. 6 is a cross-sectional view taken along the line 6—6 of FIG. 4.
Figure 7:
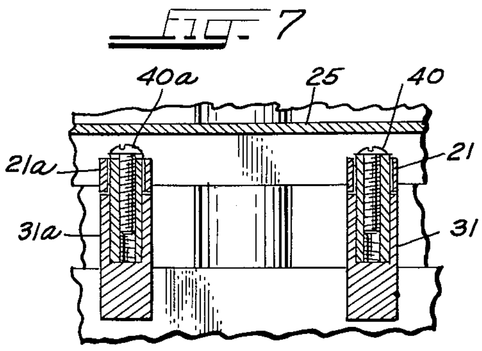
FIG. 7 is a cross-sectional view taken along the line 7—7 of FIG. 4.

A first link 21 is pivotally connected at one end to the base 20 through a suitable screw pin 22 as best seen in FIGS. 4 and 6. More particularly, the pin 22 passes through an opening through an inturned lip 23 of the base 20, threadedly engages the link 21, and the unthreaded end thereof enters a collar-like member 24 secured to a partition 25 forming a part of the base 20. The pin 22 is thereby fixed to the link 21, and the opposite ends thereof are rotatable with respect to the base 20. Obviously the opening in the lip 23 and the opening in the collar-like member 24 should be of such size as to provide good bearing surfaces for the ends of the pin 22.

A second link 31 is connected at its right hand end, as viewed in FIG. 4, for pivotal movement about a pin 32. This pin threadedly engages a collar 33 which is slidable on a horizontal pin 34, the pin 34 being suitably secured to the base 20. Accordingly, the right hand end of the link 31 is connected to the base 20 for pivotal movement and for sliding movement with respect thereto. It should be noted that the axis of the pin 22 and the axis of the pin 32 are both substantially vertical. It is also important that the line of the horizontal pin 34 intersect the axes of the screws 22 and 32 and be perpendicular thereto.

The left hand end of the second link 31 is pivotally connected through a pin 36 to a member which supports the cartridge head for pivotal movement about a horizontal axis. More particularly, and as best seen in FIGS. 5 and 6, the left hand end of the second link 31 is pivotally connected by the pin 36 to one end of a tie element or bar 37 which has flattened ends, one of which lies between flange-like portions 38 and 39 of the arm 31. The pin 36 threadedly engages the short flange 39 while the head thereof engages the lower flange 38, one flattened end of the bar 37 having an opening of such diameter as to receive the pin 36 while permitting relative rotation of the parts.

The right hand end of the first link 21 is pivotally connected to the midpoint of the link 31 through a pin 40. The particular form of the four pivotal connections involving the pins 22, 32, 36 and 40 have no particular bearing on the invention. It is necessary only that these pivotal connections provide a minimum of friction and that the pivotal axes be maintained at all times true and substantially parallel to each other, it being understood that the axes of the pins 32, 36 and 40 define and lie in a single plane. Reference to the detailed, cross-sectional views 6, 7 and 9 reveals that collars or bushings are employed in some instances to better obtain these desired results, all as is well understood in the art. Since the specific structure of these pivotal connections does not of itself constitute a feature of the present invention they are not described in further detail herein.

In FIGS. 3 and 5 it may be seen that the two flattened ends of the bar 37 are connected to the corresponding links 31 and 31*a* of the two linkages through corresponding pins 36 and 36*a*.

In order that the stylus 16 may be moved into and out of engagement with a record 18, the cartridge head 17 is pivotally mounted on the rod 37 in any suitable manner such as is illustrated in the drawings. A spring 41 may be employed to increase or decrease stylus pressure as may be required in order to obtain the desired stylus pressure, in view of the combined weight of the cartridge and cartridge head. In FIG. 5 is will be seen that the spring 41 is arranged to decrease stylus pressure.

The critical characteristics of each of the two linkages, as in any Scott Russell type linkage, are that the distances between the axis 40 and the axes 22, 32 and 36 be equal, that the axes 32, 36 and 40 lie in a common plane, and that the line of sliding movement of the axis 32 intersect the axis 22 as well as the axis 32. This line of sliding movement of each linkage should also be perpendicular to these axes. The critical relationship between the two linkages is that the lines of sliding movement of the axes 32 and 32*a* and the two planes referred to above, be parallel. With such a construction it follows that any point on the free axis 36 will move at all times along a straight line which intersects the axis 22 and is perpendicular to the line of sliding movement of the axis 32.

Proof of this limitation on the movement of the free axis 36 is demonstrated below with reference to FIG. 10. In this diagram the four pivotal axes 22, 32, 36 and 40 are represented, the links 21 and 31 being shown as full lines extending between the proper ones of these pivot points. Phantom lines are shown extending through the axes 22 and 36 and the axes 22 and 32. If it can be shown that the angle A plus the angle C is always 90°, for any position of the linkage, then the point on the axis 36 shown in FIG. 10 is confined to movement along a straight line, namely the phantom line intersecting the axes 22 and 36.

Angles A, B, C and D are designated in FIG. 10 and are referred to in the ensuing equations:

(1) $A=B$ (base angles of isosceles triangle)
(2) $C=D$ (base angles of isosceles triangle)
(3) $A+B+C+D=180°$ (sum of internal angles of a triangle)
(4) $2A+2C=180°$ (substituting Equations 1 and 2 in Equation 3)
(5) $A+C=90°$ Since $A+C$ always equals 90°, and since the solution is general to all positions of the linkage, the axis 36 always intersects the phantom line which is perpendicular to the fixed line of sliding movement of the axis 32 and intersects the latter at the axis 22. Therefore the axis 36 is confined to linear movement in one given direction. Since each of the axes 36 and 36*a* of the pair of linkages is confined to linear movement, it will be apparent that the bar 37 must move along a straight line without change in its orientation.

It should be noted that the only requirements of the linkages for obtaining this result are those specified above. In particular it should be noted that the two axes 36 and 36*a* neeed not move along the same line and that the specified distances between axes of one linkage need not be the same as the specified distances between the axes of the other linkage. It is preferred, however, that the linkages be identical and that they be arranged side-by-side as illustrated in FIG. 3.

Figure 8:
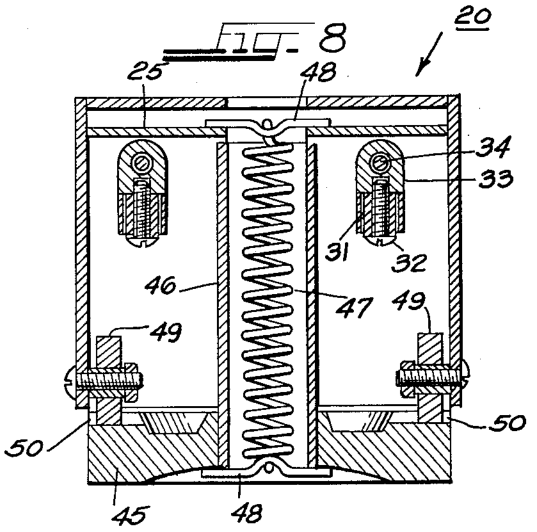
FIG. 8 is a cross-sectional view taken along the line 8—8 of FIG. 4.
Figure 9:
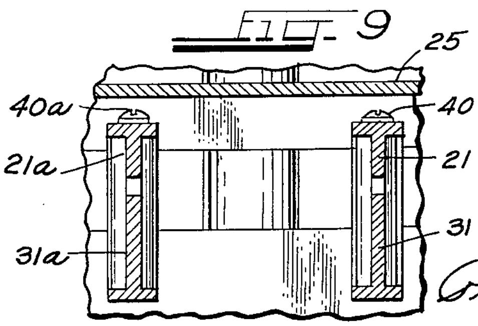
FIG. 9 is a cross-sectional view taken along the line 9—9 of FIG. 4.

Preferably the base 20 is arranged to pivot on the phonograph stand 11 to permit withdrawal of the entire tone arm assembly from record playing position. For this purpose the base 20 is mounted on a pedestal 45 having a rigid, upstanding column 46, as shown in FIG. 8. The ends of a spring 47, within the column, engage clips 48 which in turn engage the lower end of the column and the upper surface of the partition 25. The downward force thus applied to the base 20 is borne by a pair of rollers 49, rotatably supported on a downward extension of the base 20 and riding on the upper surface of the pedestal. A suitable annular dovetail connection between the bottom of the base 20 and the pedestal 45 is preferably provided to assure proper centering. Diametrically opposed slots 50, seen in FIGS. 4 and 8 receive the rollers 49 to lock the base 20 in record playing position, and like slots 51 lock the base in withdrawn position.

A tone arm assembly has now been disclosed which confines the record engaging stylus to movement along a given line, which line may be made radial of the turntable simply by properly positioning the base 20 or pedestal 45 with respect to the turntable. The tone arm assembly also maintains fixed orientation of the stylus. The stylus may therefore be maintained tangent to that portion of the record groove engaged by the stylus at all times.

While a particular embodiment of the invention has been disclosed, it will be understood, of course, that the invention is not limited thereto since many modifications may be made, and it is, therefore, contemplated to cover by the appended claims any such modifications as fall within the true spirit and scope of the invention.

I claim:

1. A tone arm assembly for a phonograph, disc recorder or the like having a turntable, comprising: a normally stationary supporting frame having a free-end portion adapted to project toward said turntable; a pair of Scott Russell straight line mechanisms mounted upon the underside of said frame in side-by-side position, each of said Scott Russell mechanisms respectively including a first link having first and second end portions, said first end portion of said first link being pivotally supported upon said free-end portion of said frame about a first pivotal axis, a second link having first and second end portions, means on said frame inwardly of said free-end portion thereof for supporting said first end portion of said second link for pivotal movement about a second pivotal axis parallel to said first pivotal axis, and means on said second end portion of said first link pivotally supporting an intermediate portion of said second link for pivotal movement about a third pivotal axis parallel to said first and second pivotal axis, the distances between said first and third axes and said second and third axes being constant and equal in each of said Scott Russell mechanisms, said second and third pivotal axes in each of said Scott Russell mechanisms respectively lying in and defining a plane and said planes being parallel; a tie element extending between and pivotally joined at a pair of fourth pivotal axes to the respective second end portions of said second links of said Scott Russell mechanisms, said fourth pivotal axes respectively lying in said planes and being parallel to the others of said pivotal axes therein with the distance between said third and fourth pivotal axes in each of said Scott Russell mechanisms being equal and equal to the distance between said second and third axes therein, said Scott Russell mechanisms and said links thereof and said tie element being supported entirely by said frame for movement with respect thereto about said pivotal axes; and stylus carrying means mounted on said tie element and adapted to be disposed above said turntable, said Scott Russell mechanisms serving to limit said stylus carrying means to linear movement with respect to said frame.

2. The combination set forth in claim 1, including means for pivotally mounting said frame alongside said turntable, whereby said frame and said Scott Russell mechanisms thereon and said tie element and said stylus carrying means may be pivoted as a unit away from said turntable when said stylus carrying means is not in use.

3. A tone arms assembly for a phonograph, disc recorder or the like having a turntable, comprising: a normally stationary support means disposed alongside said turntable; a pair of Scott Russell straight line mechanisms mounted upon said support means in side-by-side position, each of said Scott Russell mechanisms including a first link having first and second end portions, said first end portion of said first link being pivotally supported upon said support means about a first pivotal axis, a second link having first and second end portions, means on said support means for supporting said first end portion of said second link for pivotal movement about a second pivotal axis parallel to said first pivotal axis, and means on said second end portion of said first link pivotally supporting an intermediate portion of said second link for pivotal movement about a third pivotal axis parallel to said first and second pivotal axes, the distances between said first and third axes and said second and third axes being constant and equal in each of said Scott Russell mechanisms, said second and third pivotal axes in each of said Scott Russell mechanisms respectively lying in and defining a plane and said planes being parallel; a tie element extending between and pivotally joined at a pair of fourth pivotal axes to the respective second end portions of said second links of said Scott Russell mechanisms, said fourth pivotal axes respectively lying in said planes and being parallel to the others of said pivotal axes therein with the distance between said third and fourth pivotal axes in each of said Scott Russell mechanisms being equal and equal to the distance between said second and third axes therein, said Scott Russell mechanisms and said links thereof and said tie element being supported entirely by said normally stationary support means for movement with respect thereto about said pivotal axes; and stylus carrying means mounted on said tie element and adapted to be disposed above said turntable, said Scott Russell mechanisms serving to limit said stylus carrying means to linear movement with respect to said normally stationary support means.

4. The combination set forth in claim 3, wherein all of said pivotal axes are parallel to the axis of said turntable.

5. The combination set forth in claim 3, wherein all of said pivotal axes are parallel to the axis of said turntable, and wherein said stylus carrying means is pivotally mounted upon said tie element about an axis normal to the axis of said turntable, whereby said stylus carrying means may be lifted from said turntable independently of movement of said Scott Russell mechanisms.

6. The combination set forth in claim 3, wherein said means in each of said Scott Russell mechanisms for supporting said first end portion of said second link therein for pivotal movement about said second pivotal axis includes slide means permitting said second axis to move and confining the movement thereof to a line extending through said first and second axes and normal thereto.

7. The combination set forth in claim 6, wherein said slide means in each of said Scott Russell mechanisms includes a straight pin rigidly secured to said normally stationary support means with the axis of said pin extending through said first pivotal axis and normal thereto, and a sleeve slidable on said pin, said first end of said second link being pivotally connected to said sleeve.

References Cited in the file of this patent

UNITED STATES PATENTS 2,522,997 Coppleman ____________ Sept. 19, 1958

FOREIGN PATENTS 715,971 France _________________ Dec. 12, 1931
386,851 Great Britain __________ Jan. 26, 1933

OTHER REFERENCES

Mechanism, by J. S. Beggs, 1955, published by McGraw-Hill Book Co., Inc., page 203. (Copy in U.S. Patent Office Library.)